M. J. KELLY.
DIFFERENTIAL DRIVE MECHANISM.
APPLICATION FILED MAR. 30, 1914.
1,134,138.
Patented Apr. 6, 1915.
2 SHEETS—SHEET 1.
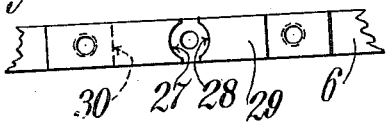
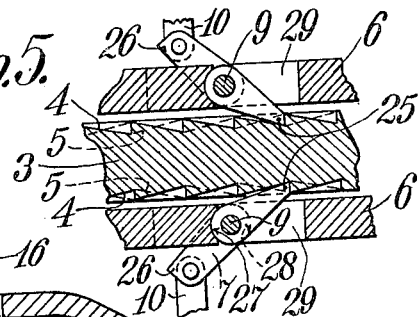
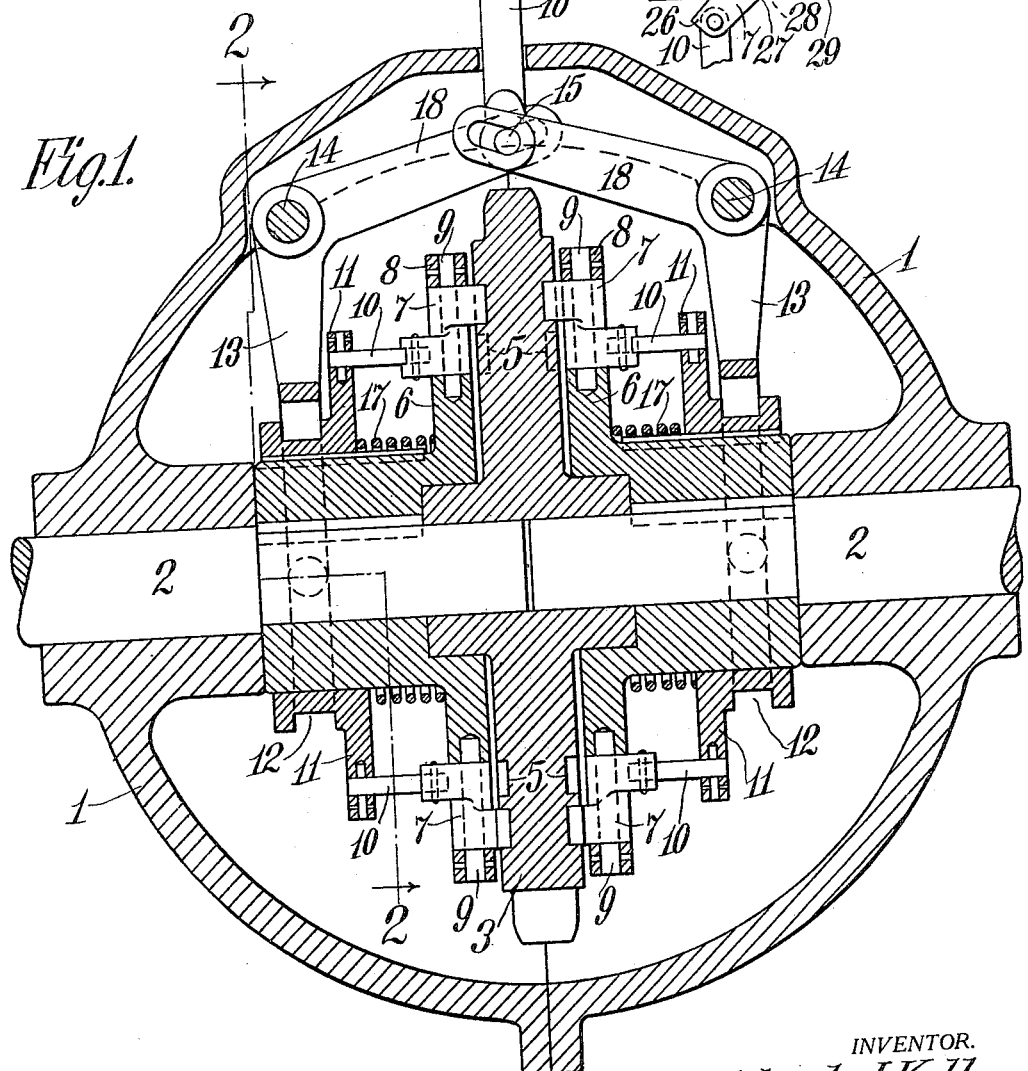
WITNESSES:
H. E. Hartwell.
E. M. Potter
INVENTOR.
Michael J. Kelly.
BY Chapin & Co.
ATTORNEY.
THE NORRIS PETERS CO., PHOTO-LITHO., WASHINGTON, D. C.

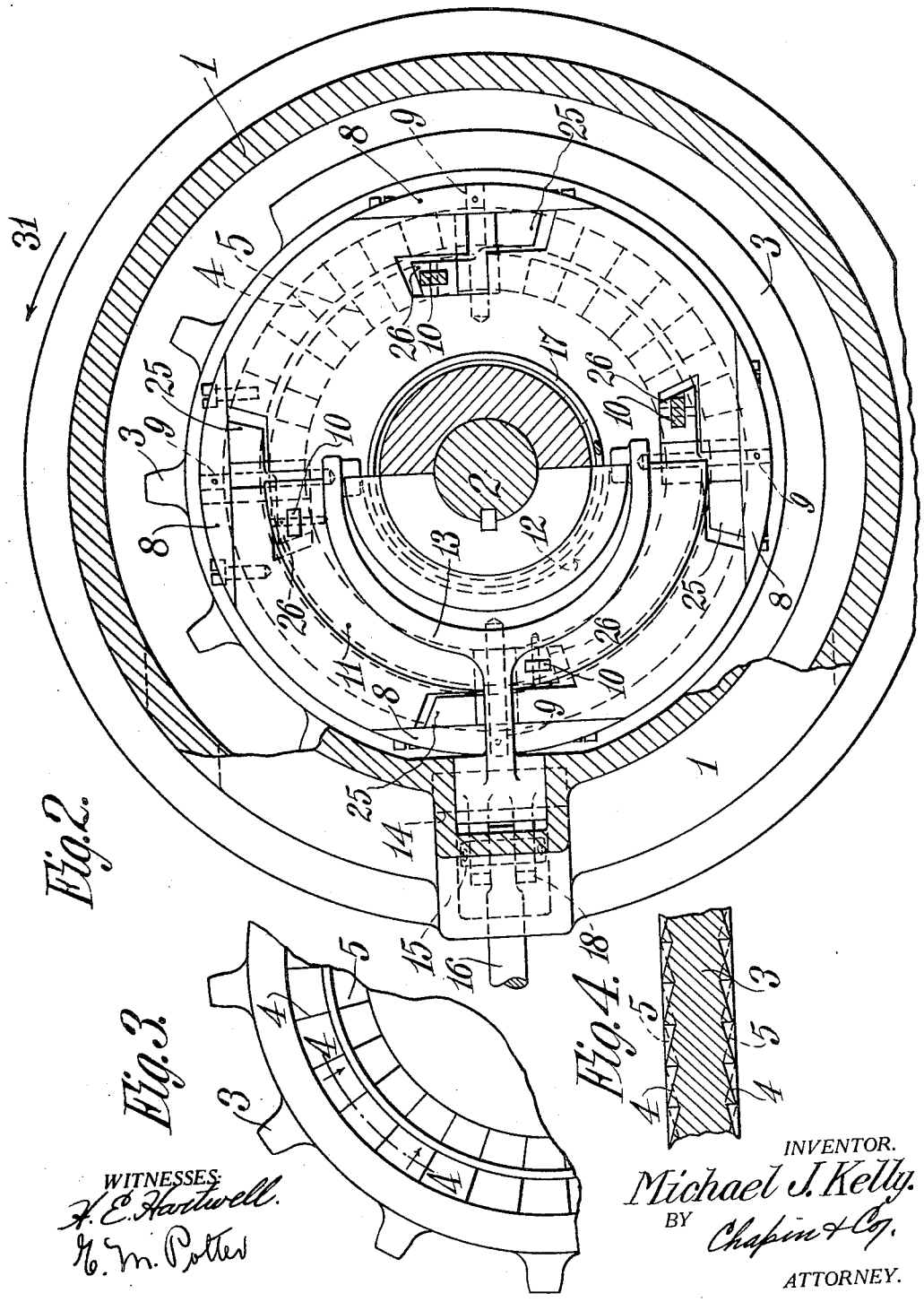

UNITED STATES PATENT OFFICE.

MICHAEL J. KELLY, OF SOUTH LEE, MASSACHUSETTS.

DIFFERENTIAL DRIVE MECHANISM.

1,134,138.  Specification of Letters Patent.  Patented Apr. 6, 1915.

Application filed March 30, 1914. Serial No. 828,130.

*To all whom it may concern:*

Be it known that I, MICHAEL J. KELLY, a citizen of the United States of America, residing in South Lee, in the county of Berkshire and State of Massachusetts, have invented certain new and useful Improvements in Differential Drive Mechanism, of which the following is a specification.

This invention relates to improvements in differential driving mechanism for automobiles and other self-propelled vehicles.

An object of the invention is to provide simple and efficient mechanism for driving the rear axle of a motor vehicle, which, in addition to the usual driving functions, has differential functions as well.

Another object of the invention is to provide a novel form of ratchet mechanism in connection with divided axles which drives both axle sections either forwardly or backwardly at the same speed and allows one section to turn at a higher rate than the other when the vehicle is rounding a curve.

A further object is to improve generally and render more efficient the mechanical structure, as will be hereinafter more particularly pointed out.

In general my device consists of a driving gear or sprocket loosely mounted on the divided axles, two series of reversely arranged ratchet teeth in each face of the driving sprocket, pawl carrying disks mounted adjacent to the sprocket and keyed to each axle section, reversible pawls carried by these disks and adapted to engage either set of ratchet teeth to permit forward or backward movement of the driving gear and means to control the position of these pawls.

I am aware that ratchet and pawl mechanism in differential driving devices is, in general, disclosed to a considerable extent in the prior art. These devices, however, commonly employ ratchets with peripherally arranged teeth and pawls mounted on pivots outwardly extending from the driving gear. Consequently, with such devices, a severe strain is placed upon the pivot of the pawl which frequently results in the distortion or failure of the device at this point. I particularly avoid this trouble by arranging the ratchet teeth in the face of the sprocket or driving gear and by so mounting the pawls in the pawl carrying disk that the strain is transmitted directly to the disk itself and not upon the pivot on which the pawl is mounted.

One embodiment of my invention is illustrated in the accompanying drawings in which:

Figure 1 is a longitudinal section of my device on the center line thereof. Fig. 2 is a transverse sectional view taken on the line 2—2 of Fig. 1, looking in the direction of the arrows. Fig. 3 is a detail view of a portion of the driving sprocket. Fig. 4 is a sectional view on the line 4—4 of Fig. 3. Fig. 5 is a detail view illustrating the manner of mounting the pawls in the pawl carrying disk. Fig. 6 is a plan view of a portion of the pawl carrying disk.

Referring to the drawings, particularly to Figs. 1 and 2, 1 is the usual differential casing, made in two pieces bolted together and mounted centrally on the rear axle. The rear axle is of the divided type and comprises two sections 2, which are rotatably mounted in the casing 1. Centrally located and loosely mounted on the axle sections 2 is the sprocket 3 which may be connected by means of a sprocket chain to any suitable form of motive power in the customary way. For convenience and purposes of illustration I show a sprocket wheel but I do not limit myself to this specific form of driving gear as other forms, for example, a bevel gear, may be substituted without departing from the scope of my invention.

On each face of the sprocket 3 are arranged two concentric rows of ratchet teeth 4 and 5 (see Figs. 3 and 4). The teeth in row 4 are reversely arranged or oppositely disposed to those in the row 5, as clearly shown in Fig. 4. Closely adjacent each face of the sprocket 3 are mounted the pawl carrying disks 6 which are keyed to the axle sections 2 and rotate therewith. It is to be noted particularly in this connection that the hubs of the disks are extended to meet the hubs on the differential casing 1, thereby providing ample means to receive the end thrust to which these disks are subjected in operation. Also the hub of the driving sprockets is positively positioned on the shafts 2 by means of these same pawl bearing disks 6.

Mounted in each of the disks 6 are a number of pawls 7, four being shown in the drawings. Each pawl 7 (see Figs. 1, 2, 5 and 6) is mounted on a pivot 9 and comprises two pawl shaped arms 25 and 26. The arm 25 is above the arm 26 and is adapted to engage the teeth in row 4 of the sprocket 3. The disk 6 is provided with openings 29 and 30 in which the arms 25 and 26 respectively, can freely move. Furthermore, the disk 6, is provided with semi-cylindrical finished surfaces 27 and 28. The surface 27 is above the surface 28 and is adapted to receive the semi-cylindrically finished end of the upper arm 25 of pawl 7. Similarly, the surface 28 receives the finished end of arm 26 of pawl 7. Thus, as the end of each arm of pawl 7 abuts a finished surface, no strain is placed upon the spindle 9. Obviously any strain received in operation would be transmitted directly to disk 6 which is amply proportioned to receive such strain. To permit the finishing of surfaces 29 and 30, the disks 6 are provided with caps 8 which receive the pivot 9 and are screwed to the disks 6.

Slidably mounted on feather keys in the hubs of disks 6 are disks 11. These disks are maintained in the position shown in Fig. 1 by the springs 17 and may be forced inwardly against springs 17 by means of the forked arms 13, the ends of which rest in circumferential grooves 12 in members 11. These members 13 are pivotally mounted at 14 in the differential casing 1 and have bell crank extensions 18. The latter are connected together and to a rod 16 by a pin 15 working in slotted holes in members 18. The rod 16 which passes through the casing 1 is an operating rod by means of which the pawl 7 may be reversed as will be described.

Pivotally mounted on the disks 11 are a number of links 10 which in turn are pivotally connected to the lower arms 26 of pawls 7. This construction is clearly shown in Figs. 1 and 5. It will be evident from these figures that as the links 10 are forced inwardly the arm 25 of pawl 7 will be withdrawn from engagement with the ratchet teeth in row 4 and the arm 26 will be forced into engagement with the teeth in row 5. Thus reverse movement is permitted. The rod 16 may be connected to the reverse lever of the vehicle or may be independently operated in any suitable manner.

The operation of the mechanism is as follows: With the parts in the position shown in Figs. 1 and 2 and assuming that the sprocket 3 is rotating in the direction of the arrow 31 (see Fig. 2), it is obvious that the ratchet teeth in rows 4 will drive disks 6 in the direction of the arrow 31 through the arms 25 of pawls 7. Furthermore, each section 2 of the rear axle will be positively driven at equal speeds. Now, assume that the vehicle is rounding a curve, which necessitates differential rotation of the axle sections unless slipping of the wheels is permitted. The section 2 of the axle fixed to the wheel on the inside of the curve will be positively driven, as before. The other section is, however, permitted to rotate faster by the construction shown. The disk 6 keyed to the latter section will rotate at greater speed than the sprocket 3 and the pawls 6 will snap over the teeth in row 4 to permit this action.

The above action, with the advantages incident thereto, are possible with reverse movement of the sprocket 3. When the latter is reversed, the rod 16 is operated, which as previously described, removes the arms 25 from engagement with the teeth in rows 4 and forces the arms 26 into engagement with the teeth in rows 5. Thus the axles 2 are driven in a reverse direction.

It will be seen that I have provided a simple and efficient differential mechanism with a novel arrangement of pawls and ratchet teeth which insures positive and reliable operation. It is to be understood that I do not limit myself to the specific structure disclosed as the scope of my invention is more truly defined in the appended claims.

What I claim is:

1. A differential mechanism, comprising in combination, divided axle sections, a sprocket or driving gear loosely mounted on said sections, said sprocket being provided with two concentrically arranged series of ratchet teeth in each face thereof, the teeth in one of said rows being oppositely disposed to the teeth in the other row, disks fixed to each axle section and adjacent the sprocket, reversible pawls mounted in said disks and normally in engagement with the ratchet teeth in one of said rows and means to reverse the pawls to cause them to engage the teeth in the other row of said sprocket.

2. A differential mechanism, comprising in combination, divided axle sections, a sprocket or driving gear loosely mounted on said sections, said sprocket being provided with two concentrically arranged series of ratchet teeth in each face thereof, the teeth in one of said rows being oppositely disposed to the teeth in the other row, disks fixed to each axle section and adjacent the sprocket, reversible pawls mounted in said disks and normally in engagement with the ratchet teeth in one of said rows and means to reverse the pawls to cause them to engage the teeth in the other row of said sprocket, said means comprising members slidably mounted and rotatable with said disks, links connecting said members and said pawls, springs to position said members from said disks and operative means to move said members against said springs to reverse the pawls.

3. A differential mechanism comprising in combination, divided axle sections, driving means loosely mounted on said sections, said means being provided in each face thereof with concentrically arranged rows of ratchet teeth, the teeth in one of said rows being reversely arranged to the teeth in the other row, disks fixed to each axle section and mounted adjacently to each face of the driving means, a plurality of double armed pawls mounted in each of said disks and normally in engagement with the teeth in one of said rows, whereby each axle section is driven in the same direction by said sprocket, and means to force the pawls into engagement with the teeth in the other row, whereby both axle sections are driven in the same direction but in a reverse direction to the former rotation.

MICHAEL J. KELLY.

Witnesses:
F. G. NEAL,
H. E. HARTWELL.

Copies of this patent may be obtained for five cents each, by addressing the "Commissioner of Patents, Washington, D. C."